US011521757B2

(12) United States Patent
O'Brien et al.

(10) Patent No.: US 11,521,757 B2
(45) Date of Patent: Dec. 6, 2022

(54) INADVERTENT ACTUATION BLOCK VALVE FOR A SMALL MODULAR NUCLEAR REACTOR

(71) Applicants: Curtiss-Wright Flow Control Corporation, Farmingdale, NY (US); NuScale Power LLC, Corvallis, OR (US)

(72) Inventors: Hugh S. O'Brien, Huntington, NY (US); William Jeffrey Velkoff, Jr., W. Islip, NY (US)

(73) Assignees: CURTISS-WRIGHT FLOW CONTROL CORPORATION, Farmingdale, NY (US); NUSCALE POWER LLC, Corvallis, OR (US)

( * ) Notice: Subject to any disclaimer, the term of this patent is extended or adjusted under 35 U.S.C. 154(b) by 610 days.

(21) Appl. No.: 16/294,062

(22) Filed: Mar. 6, 2019

(65) Prior Publication Data
US 2019/0362861 A1 Nov. 28, 2019

Related U.S. Application Data

(60) Provisional application No. 62/676,665, filed on May 25, 2018.

(51) Int. Cl.
*F15B 20/00* (2006.01)
*F16K 17/08* (2006.01)
(Continued)

(52) U.S. Cl.
CPC ............ *G21C 9/004* (2013.01); *G21C 15/18* (2013.01); *G21D 3/06* (2013.01); *F15B 20/004* (2013.01);
(Continued)

(58) Field of Classification Search
CPC .......... G21C 9/004; G21C 15/18; G21D 3/06; F15B 20/004; F16K 17/04; F16K 17/10; F16K 17/087
See application file for complete search history.

(56) References Cited

U.S. PATENT DOCUMENTS 2,203,367 A * 6/1940 Schorer ................. F16K 17/087
137/70
2,398,503 A * 4/1946 Paasche ............. G05D 16/0619
137/505.34
(Continued)

FOREIGN PATENT DOCUMENTS

CH 127601 A * 11/1928 ........... F16K 17/087
DE 1600818 A1 * 4/1970 ............. F25B 41/20
DE 3418353 A1 * 11/1985 ............... G21C 9/00

*Primary Examiner* — Jessica Cahill
(74) *Attorney, Agent, or Firm* — Pearne & Gordon LLP

(57) ABSTRACT

An inadvertent actuation block valve includes inlet and outlet orifices being in selective fluid communication via a chamber. A disc is disposed within the chamber and a bellows is configured to contract at a predetermined pressure differential between reactor fluid entering a reference pressure orifice and control fluid entering the inlet orifice. When the bellows contracts, the disc engages the outlet orifice and isolates fluid communication between the inlet and outlet orifices. The inadvertent actuation block valve prevents inadvertent opening of an emergency core cooling valve when a reactor is at operating pressure that is above the predetermined set pressure range. The inadvertent actuation block valve permits the emergency cooling valves to open and to remain open when reactor pressure is below the predetermined set pressure range. The inadvertent actuation block valve does not impede long term emergency cooling that occurs when the reactor is at low pressure.

15 Claims, 12 Drawing Sheets

(51) Int. Cl.
*F16K 17/04* (2006.01)
*F16K 17/10* (2006.01)
*G21C 9/004* (2006.01)
*G21D 3/06* (2006.01)
*G21C 15/18* (2006.01)

(52) U.S. Cl.
CPC ............ *F16K 17/04* (2013.01); *F16K 17/087* (2013.01); *F16K 17/10* (2013.01)

(56) References Cited

U.S. PATENT DOCUMENTS

| | | | | |
|---|---|---|---|---|
| 2,732,853 | A * | 1/1956 | Schwarz | G05D 16/0688 137/116.5 |
| 3,037,362 | A * | 6/1962 | Tilney | F25B 41/20 62/196.3 |
| 3,300,135 | A * | 1/1967 | Slater | B64D 35/00 236/34.5 |
| 3,620,501 | A * | 11/1971 | Friedell | F16K 17/0466 251/333 |
| 4,066,091 | A * | 1/1978 | Itoh | F02D 11/08 137/79 |
| 4,294,402 | A * | 10/1981 | Vollmer | F24D 19/1006 236/12.1 |
| 5,002,089 | A * | 3/1991 | Reedy | G05D 16/0619 137/505.35 |
| 5,363,875 | A * | 11/1994 | Vollmer | E03C 1/106 137/107 |
| 7,299,817 | B2 * | 11/2007 | Gisler | B64G 1/286 137/81.1 |
| 7,845,575 | B2 * | 12/2010 | Franconi | G05D 23/022 236/93 R |
| 7,905,247 | B2 * | 3/2011 | Campeau | F16K 1/307 137/494 |
| 8,561,914 | B2 * | 10/2013 | Jung | G05D 23/022 236/99 R |
| 2005/0016591 | A1 * | 1/2005 | Griffiths | F16K 37/0041 137/486 |
| 2005/0039797 | A1 * | 2/2005 | Carlson | G05D 16/0655 137/494 |
| 2008/0196733 | A1 * | 8/2008 | Vena | A61K 8/22 132/202 |

* cited by examiner

INADVERTENT ACTUATION BLOCK VALVE FOR A SMALL MODULAR NUCLEAR REACTOR

GOVERNMENT INTEREST

This invention was made with Government support under Contract No. DE-NE0000633 awarded by the Department of Energy. The Government has certain rights in this invention.

FIELD OF THE INVENTION

This application relates generally to a valve for a nuclear reactor, and more particularly, to an inadvertent actuation block valve in an emergency core cooling system for a small modular nuclear reactor.

BACKGROUND OF THE INVENTION

Conventional means for producing electricity typically include a turbine and a force that rotates said turbine. The force can be provided in a variety of different forms; a simplistic and primitive example is a water wheel. The water wheel is placed in a flowing body of water (e.g., river, stream, etc.) and is connected to a generator via a shaft. The flowing body of water causes the wheel to rotate which, in turn, rotates the shaft. The generator receives mechanical energy from the rotating shaft and converts it into electrical energy.

Currently, demands for electricity are much greater than they have been in the past. To meet this demand, industrial power plants have been created to produce electricity on a large scale. Some power plants create the force to spin the turbine by burning material (e.g., coal, natural gas, oil, etc.) to heat and turn water into steam. The steam is then used to spin the turbine. This process is no longer desirable due to environmental concerns. That is, the burning of material releases carbon or pollutants into the air, which negatively impacts the environment.

Nuclear power plants do not share the aforementioned deficiency; this is because nuclear power plants do not burn materials to generate steam. Rather, a process called nuclear fission is used. In short, a solid uranium fuel is disposed within a reactor and surrounded by water. When the reactor operates, uranium atoms split, releasing neutrons and heat. This heat is used to create the steam to spin the turbine. While there are many advantages to nuclear power plants, they also present their own hazards. Specifically, the potential exposure of radiation to the public.

Nuclear power plants include cooling modules to maintain the nuclear reactor at a safe and operable temperature. Previously, one nuclear reactor experienced a loss of cooling which resulted in the melting of its nuclear reactor core. After such accidents, many organizations throughout the world began implementing stringent regulations in order to decrease the potential of a major meltdown occurring.

Other problems associated with nuclear power plants are their size and the amount of resources it takes to maintain the operation of the power plant. That is, nuclear power plants require a large amount of land to accommodate the size of the reactor, its safety barriers, cooling modules (e.g., cooling towers), and electrically operated cooling pumps. Moreover, the cost to construct, operate, and maintain a nuclear power plant is high.

A nuclear plant with a small reactor can realize benefits of improved costs to construct and operate a new plant. There are further economic benefits to a small nuclear reactor in that it can be a modular assembly that can be constructed with more than one reactor module to provide increased power generation capacity when such an increased capacity is desired and economically beneficial. Furthermore, the quantity of reactor modules can be increased such that the total capacity of the multiple small reactor modules is comparable to the capacity of a large conventional nuclear power generation plant. Another relevant benefit of the small modular reactor is the reduced power capacity has a reduced need for cooling in an emergency event wherein the normal methods to control reactor temperature experience an accident condition. The small modular reactor is capable of achieving emergency cooling via a natural circulation of fluids between the reactor and the containment space, whereby the containment water is cooled by heat transfer of the containment fluid through the containment vessel wall and to a pool of cool water that surrounds the containment vessel. The said emergency cooling system is a system of valves that are closed during reactor operation and are open during emergency cooling. The emergency cooling valves, when opened, permit the circulation of fluid that accomplishes the emergency cooling. This is done without the need of pumps or any other input of emergency power. A component of the invention herein is an inadvertent actuation block valve of the emergency core cooling system. The inadvertent actuation block valve selectively permits or prevents the emergency cooling valves from opening, dependent upon the pressure of the reactor being below or above a predetermined set pressure. The operational characteristics and benefits of the inadvertent actuation block valve are further described herein.

BRIEF SUMMARY OF THE INVENTION

In accordance with one aspect, there is provided an inadvertent actuation block valve for a main valve in an emergency core cooling system of a small modular nuclear reactor. The inadvertent actuation block valve includes a housing having a chamber, a first inlet orifice, a second inlet orifice, and an outlet orifice. The first inlet orifice and the outlet orifice are in selective fluid communication via the chamber, and the second inlet orifice is fluidly isolated from the outlet orifice. The inadvertent actuation block valve further includes a disc disposed within the chamber. The disc has a contacting surface disposed adjacent the outlet orifice. Moreover, a spring is disposed between the disc and the outlet orifice. The spring biases the disc away from the outlet orifice. A rod is located within the chamber and positioned vertically below and adjacent to the disc. The rod is movable within the chamber. The inadvertent actuation block valve also includes a bellows secured to the rod. The bellows is configured to contract at a predetermined pressure differential between reactor fluid entering the second inlet orifice and control fluid entering the first inlet orifice. The disc translates vertically upwards when the bellows contracts such that the contacting surface of the disc engages the outlet orifice and isolates fluid communication between the first inlet orifice and the outlet orifice.

In accordance with another aspect, there is provided an emergency core cooling system for a small modular nuclear reactor. The small modular nuclear reactor includes a reactor vessel disposed within a containment vessel. The emergency core cooling system includes five main valves (three 130a reactor vent valves and two 130b reactor recirculation valves), associated pilot actuator valves 132 for each main valve, and a pool of cooling water 104. The main valve is in fluid communication with reactor fluid within the reactor vessel. The pilot valve assembly 132 is in selective fluid communication with the main valve and is disposed outside of the containment vessel. The pilot valve assembly manipulates fluid pressure within a control chamber in the main valve in order to open or close the main valve. The emergency core cooling system further includes an inadvertent actuation block valve in fluid communication with the reactor fluid within the reactor vessel and in selective fluid communication with the control pressure fluid of the main valve and fluid from the pilot actuator valve assembly. The inadvertent actuation block valve is a fail open valve and is configured to close when a pressure of the reactor fluid is greater than or equal to a predetermined differential pressure above the pilot actuator fluid pressure, which is related to the containment pressure given the 132a trip valve is open.

BRIEF DESCRIPTION OF THE DRAWINGS

FIG. 2 shows only one of the main valves, with its associated pilot actuator valve.

DESCRIPTION OF EXAMPLE EMBODIMENTS

Small modular nuclear reactors are a key part of developing safe, clean, and affordable nuclear power options. For example, small modular nuclear reactors vary in size from a couple megawatts up to hundreds of megawatts. Their relatively small size results in reduced capital investment, ability to be sited in locations not possible for conventional nuclear power plants, and provisions for incremental power additions. Moreover, small modular nuclear reactors offer distinct safeguards and security advantages over their larger counterpart.

Figure 1:
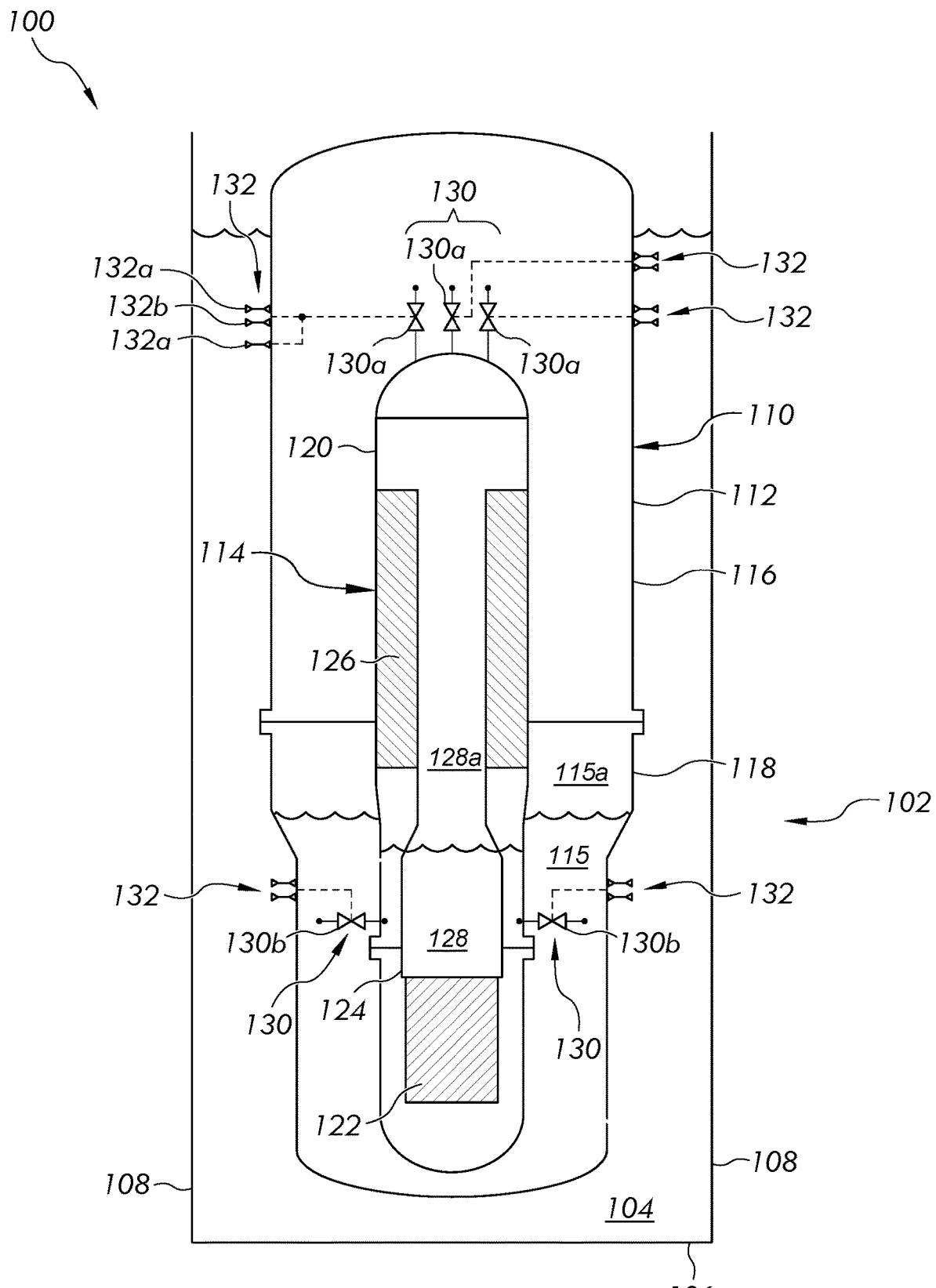
FIG. 1 is schematic depiction of a small modular nuclear reactor; This schematic shows the reactor fluid levels that would be present during a condition of emergency cooling.

Referring now to the drawings, FIG. 1 shows a small modular nuclear reactor. More specifically, the image depicts an integral pressurized-water reactor 100 comprising a reactor housing 102 having a chamber 104 defined by a bottom wall 106 and opposing side walls 108. The reactor housing 102 has an opened top that permits access to the chamber 104. Moreover, the chamber 104 houses a body of liquid (e.g., water) that is used as a heat sink for emergency cooling. A containment vessel 110 is disposed within the chamber and is at least mostly submerged by the body of liquid within the chamber 104. That is, FIG. 1 depicts the containment vessel 110 mostly submerged by the body of liquid, however, it is to be understood that the containment vessel 110 can likewise be fully submerged by the body of liquid.

The containment vessel 110 includes an outer circumferential wall 112 that completely surrounds a reactor vessel 114 housed therein. Moreover, the containment vessel 110 can house a body of containment fluid 115 and 115a during certain plant scenarios; with 115 representing a liquid portion of the fluid and 115a representing a vapor portion of the fluid. Normally, there is no fluid in this space. The containment space fluid 115a may also be a partial or full vacuum. The containment fluid composition is controlled by the operating state of the containment vessel, in terms of its pressure, temperature, and operating condition of the reactor. The containment vessel 110 includes a top body 116 and a bottom body 118 that are removably sealed to one another. That is, during normal operation of the reactor 100, the top and bottom bodies 116, 118 of the containment vessel 110 are sealed together to completely surround the reactor vessel 114. However, after operation of the reactor 100 has concluded, the top and bottom bodies 116, 118 are capable of being separated to provide access to the reactor vessel 114 housed therein. While FIG. 1 depicts the containment vessel 110 split along a horizontal axis (i.e., thereby defining the top and bottom bodies 116, 118), it is to be understood that the containment vessel 110 may be split into other configurations, for example, along a vertical axis, thereby separating the containment vessel 110 into left and right halves.

The reactor vessel 114 includes an outer circumferential wall 120 and, as shown, is in contact with the containment fluid 115, 115a. The reactor vessel 114 houses a reactor core 122, a duct 124, and steam generator coils 126. In operation, nuclear fission within the reactor core 122 increases the temperature of reactor fluid 128 located within the reactor vessel 114. The heated reactor water transfers heat to the steam generator coils 126. The generated steam is directed to another location to rotate a turbine.

FIG. 1 depicts the reactor vessel 114 being horizontally split into three sections in order to provide access to the various components housed therein. However, it is to be understood that the reactor vessel 114 is not limited to such a configuration and may be split into any number of sections (e.g., two, four, etc.). Furthermore, the reactor vessel 114 may be vertically split into left and right halves. In other words, the reactor vessel 114 may have any configuration so long as the various components (e.g., reactor core 122, duct 124, steam generator coils 126, etc.) housed therein are accessible.

While not shown, it is to be understood that the reactor 100 includes various piping structures and modules that direct the steam generated by the reactor to the turbine and provide cooling to the reactor. The reactor 100 depicted in FIG. 1 further includes an emergency core cooling system provided as a failsafe for events that cause potential overheating of the reactor. That is, if the general cooling mechanisms of the reactor 100 is compromised (e.g., damaged, rendered inoperable, etc.) such that the reactor 100 experiences unnatural temperature deviations (e.g., due to loss of normal heat removal within the reactor 100 and/or loss of decay heat removal within the reactor 100), the emergency core cooling system will provide cooling to the reactor 100 so that melting of the reactor core 122 does not occur.

As schematically shown in FIG. 1, the emergency core cooling system comprises an emergency cooling main valve 130 (hereinafter referred to as a "main valve") that is in fluid communication with the reactor vessel 114. The main valve 130 permits fluid flow between the reactor vessel 114 and the containment vessel 110. The main valve 130 is disposed outside of the reactor vessel 114. Specifically, the main valve 130 is disposed between the reactor vessel 114 and the containment vessel 110, and more specifically, the main valve 130 is secured to the outer circumferential wall 120 of the reactor vessel 114.

The reactor 100 has two separate types of main valves 130: reactor vent valves 130a and reactor recirculation valves 130b. FIG. 1 depicts the reactor 100 having three reactor vent valves 130a and two reactor recirculation valves 130b, the former being located at a top portion of the reactor vessel 114, and the latter being located on a side surface of the reactor vessel 114. More specifically, the reactor recirculation valves 130b are fully submerged in the containment fluid 115 during emergency cooling whereas the reactor vent valves 130a are located above a fluid line of the liquid containment fluid 115, shown as location 115a which is vapor. It is to be understood that the reactor's 100 emergency core cooling system may have any number and combination of main valves 130, provided there is at least one reactor vent valve and at least one reactor recirculation valve. That is, there may be any number of reactor vent valves 130a and reactor recirculation valves 130b and the number of reactor vent valves 130a does not need to be greater than the number of reactor recirculation valves 130b.

The main valves 130 are fail open valves. That is, as will be explained below, upon the loss of actuator or reactor pressure within a respective main valve 130, said main valve 130 will be in an opened position. In other words, the main valves 130 are initially in an opened position and must be pressurized to transition to a closed position.

The reactor vent valves 130a are disposed adjacent the top portion of the reactor vessel 114 (i.e., positioned above the reactor core 122) and vent fluid from the reactor vessel 114 to the containment vessel 110. That is, when the reactor vent valves 130a are in an opened position, the reactor vent valves 130a will vent reactor vapor fluid 128a from the reactor vessel 114 to the containment vessel 110, and in the closed position, the reactor vent valves 130a will not vent reactor fluid 128, 128a. As will be further explained below, the reactor vent valves 130a are in the opened position in the event that the general cooling mechanisms of the reactor 100 is compromised, leading to a failure of decay heat removal or a loss of coolant accident. The reactor vent valves 130a are also used for low temperature overpressure protection.

The reactor recirculation valves 130b are located on the side portion of the reactor vessel 114 and are likewise positioned above the reactor core 122. During emergency cooling, the reactor recirculation valves 130b permit flow of cooler water 115 from the containment vessel 110 back into the reactor vessel 114 to cool the reactor water 128. Of note, the reactor recirculation valves 130b may initially operate in a reverse flow down. That is, if a pressure of the reactor fluid 128 within the reactor vessel 114 is greater than a pressure of the containment fluid 115, 115a within the containment vessel 110, and the reactor recirculation valves 130b are in the opened position, then reactor fluid 128 will pass through the reactor recirculation valves 130b and enter the containment vessel 110. This occurs until the reactor vessel 114 depressurizes to a point when the reactor recirculation valves 130b operate normally (i.e., containment fluid 115 is directed into the reactor vessel 114).

As further shown in FIG. 1, each main valve 130 includes its own pilot valve assembly 132. The pilot valve assemblies 132 are all disposed outside of the containment vessel 110, and more specifically, are secured to the outer circumferential wall 112 or 118 of the containment vessel 110. The location of the pilot valve assemblies 132 is such that the pilot valve assemblies 132 are disconnected from (i.e., completely outside) the containment vessel 110. Such a design eliminates the need for additional containment isolation valves (which would normally be required). As will be further explained below, each pilot valve assembly 132 is in selective communication with its respective main valve 130 and configured to actuate the main valve 130.

Each pilot valve assembly 132 comprises a trip valve 132a and a reset valve 132b. It is to be understood that the number of trip and resent valves 132a, 132b within a pilot valve assembly 132 are not limited to a single value. For example, FIG. 1 depicts one reactor vent valve 130a having a pilot valve assembly 132 comprising two trip valves 132a and one reset valve 132b. The additional trip valve 132a provides an additional level of redundancy to actuate the reactor vent valve 130a.

The trip valves 132a are fail open valves and are operable between an opened position and a closed position. That is, when no electrical power is supplied to the trip valves 132a, said valves are in the opened position. During normal operation of the reactor 100, the trip valves 132a are in a closed position and, upon an event occurring, the trip valves 132a open to the opened position. The reset valves 132b are fail closed valves and are likewise operable between an opened position and a closed position. That is, when no electrical power is supplied to the reset valves 132b, said valves are in the closed position. During normal operation of the reactor 100, the reset valves 132b are likewise in the closed position and, upon an event occurring (such as supplying pressure to close the main valves 130), the reset valves 132b open to the opened position. The trip valve and reset valve actuators control the pressure within the main valve control chamber 136, such that when pressure 136 is greater than reactor pressure the main valve will close and remain close; when the pressure 136 is equal to reactor pressure the main valve will remain closed, and when pressure 136 is substantially below reactor pressure the main valve will open.

Figure 2:
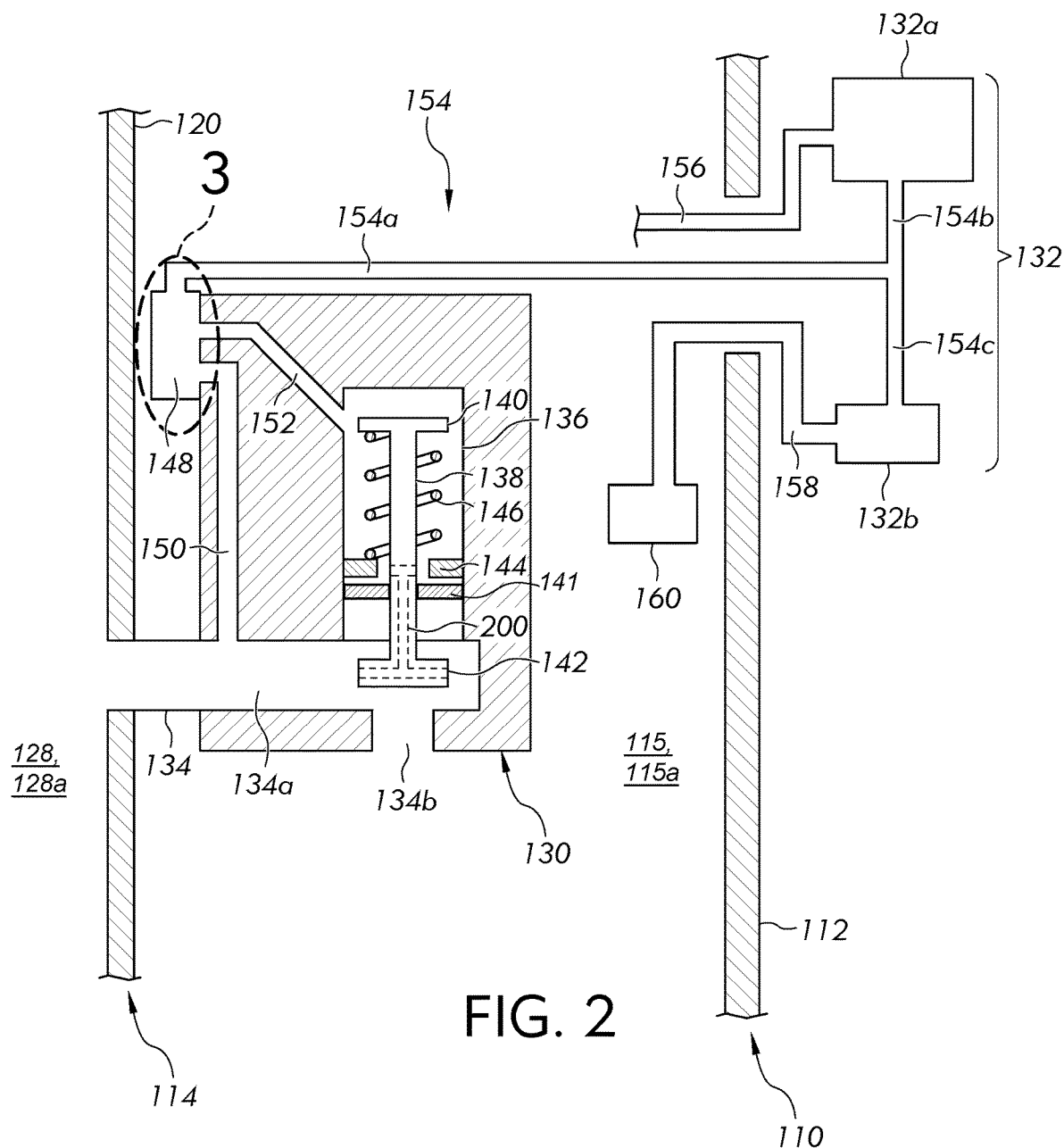
FIG. 2 is a schematic depiction of a valve system of a first embodiment of an emergency core cooling system for the small modular nuclear reactor shown in FIG. 1.

Moving on to FIG. 2, a schematic depiction of a first embodiment of an emergency core cooling system for the reactor 100 is shown. Of note, FIG. 2 depicts the main valve 130 as the reactor recirculation valve 130b (i.e., from FIG. 1). It is to be understood that the reactor vent valve 130a operates in substantially the same manner and, as such, the below disclosure likewise applies thereto. Furthermore, FIG. 2 depicts the first embodiment of the emergency core cooling system when no fluid pressure is in the system (i.e., a dry system). The first embodiment will later be explained in conjunction with other figures depicting fluid flow within the emergency core cooling system.

As shown, the reactor vessel 114 is fluidly connected to the main valve 130 (i.e., reactor recirculation valve) via a main conduit 134 having a first section 134a providing communication of reactor fluid 128, 128a to the valve and a second section 134b providing fluid communication of fluid in the valve to the containment fluid 115, 115a. The main conduit 134 places the reactor vessel 114 and the containment vessel 110 in fluid communication. With this said, the main valve 130 is configured to permit or prohibit fluid communication between the reactor vessel 114 and the containment vessel 110.

The main valve 130 includes a control chamber 136. A piston, carried on a rod 138, is disposed within the chamber 136 and comprises a first piston head 141 which is the diameter of the piston, and is connected to a second piston head 142. The first piston head 141 fluidly separates the control chamber 136 from the main conduit 134. The second piston head 142 is disposed in the main conduit 134.

The piston is vertically movable within the control chamber 136. In other words, the piston translates in a vertical direction (as illustrated in FIG. 2; it is contemplated that the valve could be oriented otherwise and the piston would translate linearly according to such orientation). As previously mentioned, the main valve 130 is a fail open valve. As shown in FIG. 2, when the emergency core cooling system is dry (e.g., no fluid pressure therein), the piston is biased to the opened position via a spring 146. That is, the piston is positioned in an upwards most position such that the second piston head 142 of the piston does not engage the second section 134b of the main conduit 134, thereby placing the reactor vessel 114 in fluid communication with the containment vessel 110. The spring 146 is shown as a compression spring, such as a coil spring, having a first end adjacent to a distal end 140 of the rod 138 of the piston, and a second end adjacent to the spring retainer plate 144. It is to be understood that the spring 146 can be of any configuration that applies a suitable force acting against compression.

The main valve 130 further includes an inadvertent actuation block valve 148 that prohibits the main valve 130 from actuating to the opened position in the event that the reactor 100 experiences a loss of power, or the trip valve is actuated to the fail open position for any other reason. As shown, the inadvertent actuation block valve 148 is assembled integrally with the main valve 130. That is, the inadvertent actuation block valve 148 is a separate and distinct component that is removably secured (e.g., bolted, fixed, etc.) to the main valve 130. It is to be understood that the inadvertent actuation block valve 148 can be disposed in a variety of different locations. For example, the inadvertent actuation block valve 148 can be located at a location spaced from the main valve 130, so long as the inadvertent actuation block valve 148 is disposed between the reactor vessel 114 and the containment vessel 110. It is understood that the emergency cooling valves 130a and 130b may not be opened during normal reactor operation as this would depressurize the reactor making it inoperable for generation of power. The inadvertent actuation block prevents opening of the main valves due to a failure of the pilot actuator valve, or an attempted operational procedure to open the trip actuator valve. The inadvertent actuation block prevents the opening of the main valve until the reactor pressure is reduced to a pressure below the set pressure determined to be suitable for operation of said main valves.

The inadvertent actuation block valve 148 is in fluid communication with the reactor vessel 114 via a first conduit 150. As shown, the first conduit 150 is in fluid communication with the first section 134a of the main conduit 134. In alternative embodiments, the first conduit 150 can be independent of the main conduit 134 such that the first conduit 150 is in direct fluid communication (i.e., no intervening members, conduits, etc.) with the reactor vessel 114. As further shown, a second conduit 152 fluidly connects the inadvertent actuation block valve 148 and the control chamber 136.

Moreover, a third conduit 154 places an outlet of the inadvertent actuation block valve 148 in fluid communication with the pilot valve assembly 132. The third conduit 154 has a main section 154a, a first branch section 154b, and a second branch section 154c. The first branch section 154b fluidly connects the trip valve 132a to the main section 154a and the second branch section 154c fluidly connects the reset valve 132b to the main section 154a. As shown, the main section 154a, the first branch section 154b, and the second branch section 154c all fluidly connect at the same junction. Alternatively, said sections can join at separate locations.

A fourth conduit 156 is connected to the trip valve 132a and is routed into the containment vessel 110. That is, as will be further explained below, a distal end of the fourth conduit 156 is positioned within the containment vessel 110 and is configured to vent a fluid to the containment vessel 110. Lastly, a fifth conduit 158 fluidly connects the reset valve 132b and a fluid source 160. As shown, the fluid source 160 can be positioned within the containment vessel 110. More specifically, the fluid source 160 can draw fluid from the containment vessel 110 or, alternatively, from a separate and distinct fluid source. Additionally, the fluid source 160 may be positioned completely outside of the containment vessel 110.

Figure 3:
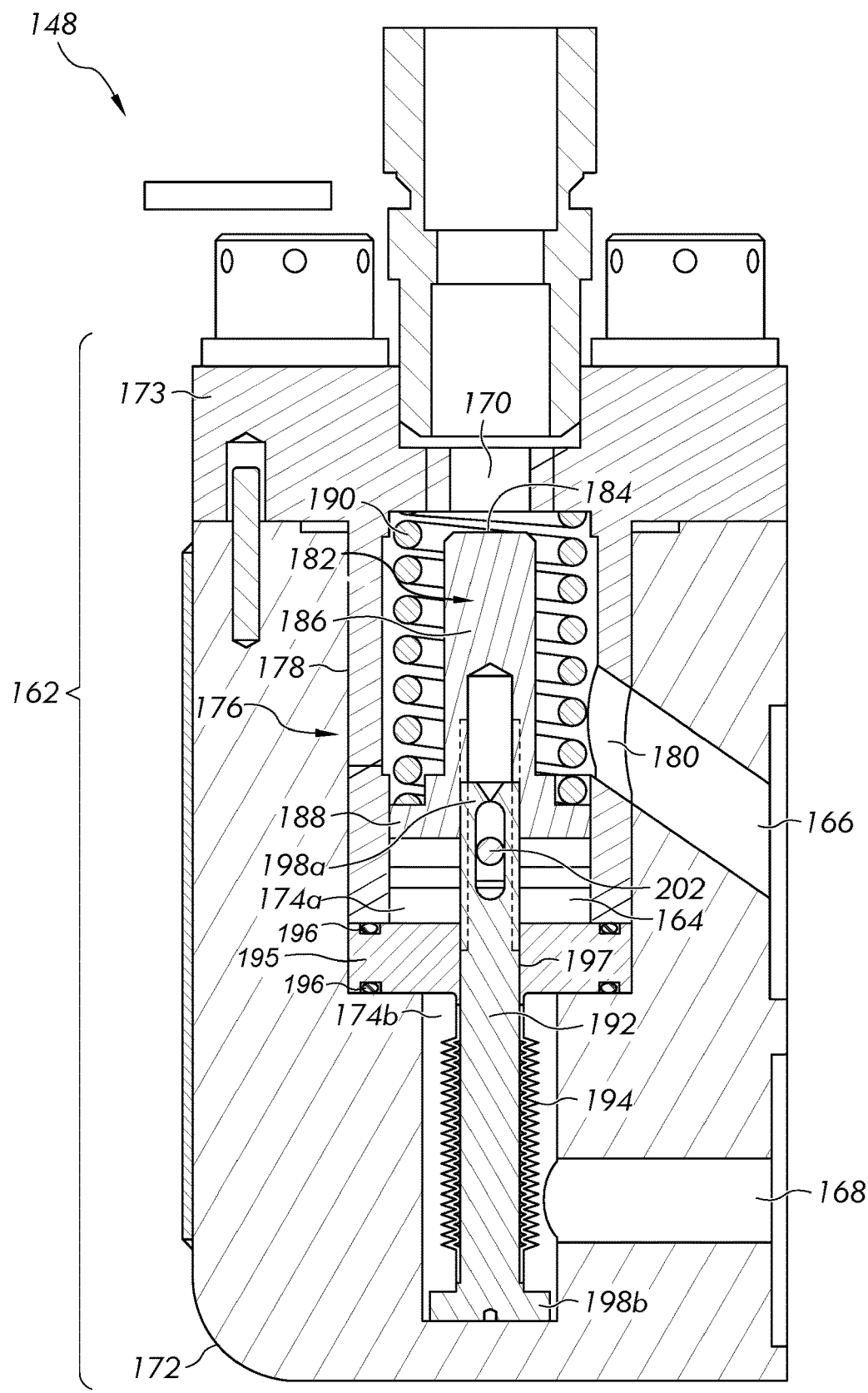
FIG. 3 is a sectional view of an inadvertent actuation block valve of the first embodiment of the emergency core cooling system shown in FIG. 3.

With respect to FIG. 3, the structure and components of the inadvertent actuation block valve 148 employed in the first embodiment of the emergency core cooling system will now be discussed. The inadvertent actuation block valve 148 is operable between an opened position and a closed position. Of note, the inadvertent actuation block valve 148 is a fail open valve. That is, in a dry system (i.e., no fluid pressure within the emergency core cooling system), the inadvertent actuation block valve 148 is in an opened position, as depicted in FIG. 3.

As shown, the inadvertent actuation block valve 148 includes a housing 162 having a chamber 164, an inlet orifice 166, a reactor reference pressure orifice 168, and an outlet orifice 170. The inlet orifice 166 and the reactor reference pressure orifice 168 are isolated from each other by the bellows 194, and a plate 195 with o-ring seals 196. Moreover, the first orifice 166 is fluidly connected to the second conduit 152 in the main valve, the reactor reference pressure orifice 168 is fluidly connected to the first conduit 150 in the main valve, and the outlet orifice 170 is fluidly connected to the third conduit 154 to the pilot actuator valves.

The housing 162 comprises a lower housing 172 and an upper housing 173. The lower housing 172 has a cavity that includes a first section 174a and a second section 174b. The first and section sections 174a, 174b of the cavity are fluidly isolated from one another such that there is no fluid communication between the first section 174a and the second section 174b. As further shown, the orifices 166, 168 are positioned within the lower housing 172 and in fluid communication with the first and second sections 174a, 174b of the cavity, respectively.

Moreover, the upper housing 173 includes a protrusion 176, such as a hollow cylindrical protrusion, oriented vertically downwards with respect to a horizontal surface of the upper housing 173. Alternatively, the protrusion 176 can have a different hollow shape (e.g., cue, cuboid, prism, etc.) that is oriented vertically downwards. The protrusion 176 includes a hollow space therein that is defined by a sidewall 178. The hollow space defines the aforementioned chamber 164 that fluidly connects the inlet orifice 166 and the outlet orifice 170. The protrusion 176 of the upper housing 173 is located within the first section 174a of the cavity such that a through hole 180 formed in the sidewall 178 of the protrusion 176 places the hollow space (i.e., the chamber 164) in fluid communication with the inlet orifice 166.

The inadvertent actuation block valve 148 further includes a disc 182 disposed within the chamber 164 that includes a contacting surface 184. The contacting surface 184 is disposed adjacent the outlet orifice 170, and acts as a selective sealing member for the outlet orifice 170. That is, the contacting surface 184 is disposed directly below the outlet orifice 170. The contacting surface 184 has a width greater than that of the outlet orifice 170. As such, as will be further explained below, when the inadvertent actuation block valve 148 is in a closed position, the contacting surface 184 engages the outlet orifice 170 and isolates (prohibits) fluid communication between the inlet orifice 166 and the outlet orifice 170. The disc 182 comprises an extension member 186 that extends vertically upwards from a base member 188. The contacting surface 184 is located at a tip (i.e., distal end) of the extension member 186.

As further shown, a spring 190 is disposed between the disc 182 and the outlet orifice 170. The spring 190 is depicted as a compression spring, such as a coil spring, that biases the disc 182 vertically downwards. That is, the spring 190 biases the contacting surface 184 of the disc 182 away from the outlet orifice 170. Moreover, the spring 190 surrounds the extension member 186 of the disc 182.

A rod 192 is located within the chamber 164 and is positioned vertically below and adjacent to the disc 182. The rod 192 is vertically movable within the chamber 164 (as illustrated in FIG. 3; it is contemplated that the valve could be oriented otherwise and the rod 192 would translate linearly according to such orientation). A bellows 194 is secured to the rod 192. As will be further explained below, the bellows 194 contracts at a predetermined pressure differential between a fluid entering the inlet orifice 166 and a fluid entering the reactor reference pressure orifice 168. Due to the contraction of the bellows 194, the disc 182 translates vertically upwards such that the contacting surface 184 of the disc 182 engages the outlet orifice 170 and thus isolates fluid communication between the inlet orifice 166 and the outlet orifice 170.

In alternative embodiments, the bellows 194 can be replaced by a different element configured to translate the disc 182 vertically upwards such that the contacting surface 184 of the disc 182 engages the outlet orifice 170. For example said element can be a metal diaphragm assembly or a metal piston assembly.

The inadvertent actuation block valve 148 further includes two metal O-rings 196 positioned at a distal end of the protrusion 176, with a metal plate that fluidly separates areas 174a and 174b. That is, one metal O-ring 196 is positioned vertically below and directly adjacent to the protrusion 176 (i.e., in physical contact therewith) and one is positioned in contact with the body 172. The rod 192 extends through an aperture 197 formed in the metal plate and connects to the bellows 194. Further still, the rod 192 comprises a first end 198a and a second end 198b. The first end 198a of the rod 192 engages the disc 182 and the second end 198b of the rod 192 includes a head. A first portion of the bellows 194 is secured to a first surface of the metal O-ring 196. That is, the first portion of the bellows 194 is physically and sealingly connected to the metal plate. Moreover, a second portion of the bellows 194 is secured (i.e., physically and sealingly connected) to the head (i.e., second end 198b) of the rod 192.

The various components of the inadvertent actuation block valve 148 are all comprised of a metal material. Specifically, the housing 162, the disc 182, the spring 190, the rod 192, the bellows 194, and the o-rings 196 with plate are all comprised of a metal material. This material selection is essential to sustaining correct functionality over a long period of time. That is, the environment within the inadvertent actuation block valve 148 experiences temperatures within a range of 500° F. to 800° F. and absolute pressures up to 2,500 psia due to the various fluids flowing therein. Other materials (e.g., plastics) would not be suitable for this environment. Each of the aforementioned components is comprised of a metal material to improve longevity of the inadvertent actuation block valve 148, thereby reducing costs associated with maintenance, repair, replacement, etc.

Figure 4:
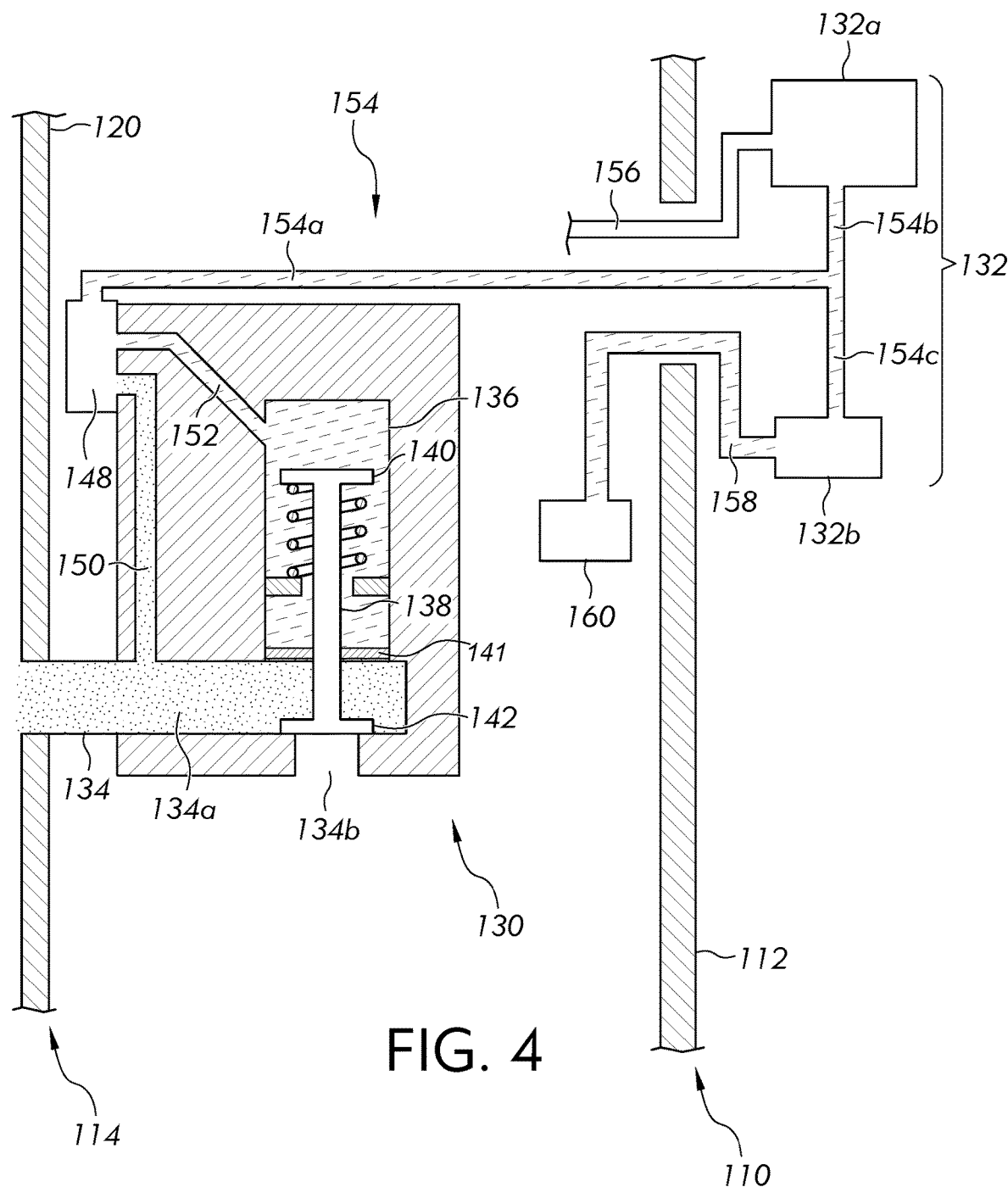
FIG. 4 is a schematic depiction of a valve system of the first embodiment of the emergency core cooling system during a start-up phase and a normal operation phase.

With reference to FIGS. 4-7B, operation of the inadvertent actuation block valve 148 employed in the first embodiment of the emergency core cooling system will now be discussed. Specifically, FIG. 4 represents the flow of fluid within the first embodiment of the emergency core cooling system upon start-up. As previously discussed, the main valve 130, inadvertent actuation block valve 148, and trip valve 132a are all fail open valves whereas the reset valve 132b is a fail closed valve. The pilot valve assembly 132 manipulates fluid pressure within the control chamber 136 of the main valve 130 in order to actuate the main valve 130 into the opened position or the closed position.

Upon start-up, the trip and reset valves 132a, 132b are actuated (i.e., electronically via a signal) such that the trip valve 132a is in the closed position and the reset valve 132b is in the opened position. With the reset valve 132b in the opened position, control fluid supplied from the fluid source 160 is directed through the reset valve 132b and to the inadvertent actuation block valve 148 via the third conduit 154. The control fluid flows through the inadvertent actuation block valve 148 (i.e., via the outlet orifice 170 and inlet orifice 166) and is directed into the control chamber 136 via the second conduit 152.

As pressure builds within the control chamber 136, the pressure of the control fluid provides a force that acts on the first piston head 141 of the piston in a downward direction (as illustrated in FIG. 4). Specifically, this force is greater than the biasing force provided by the spring 146; as such, the piston translates vertically downwards until the second piston head 142 sealingly engages the second section 134b of the main conduit 134. In this manner, reactor fluid 128 entering the main conduit 134 via the first section 134a is prohibited from flowing into the second section 134b of the main conduit 134.

It is to be understood that during the start-up operation, reactor fluid 128 may flow through the main valve 130. As the piston begins to translate vertically downwards, a pressure of the reactor fluid 128 within the first section 134a of the main conduit 134 may also provide a force that acts on the first piston head 141 of the piston and helps in translating the piston downwards into a seating position (i.e., wherein the second piston head 142 engages the second section 134b of the main conduit 134).

After start-up (i.e., during normal operation of the reactor 100), the reset valve 132b may be actuated to the closed position, thereby disallowing additional fluid from the fluid source 160 to flow into the pilot valve assembly 132. Moreover, reactor fluid 128 flows into the first conduit 150 and thus enters the inadvertent actuation block valve 148 via the reactor reference pressure orifice 168. As will be further discussed below, during normal operation of the reactor 100, the pressure differential within the inadvertent actuation block valve 148 is less than a predetermined pressure differential, and thus, the inadvertent actuation block valve 148 remains in the opened position. Further still, reactor fluid 128 enters the control chamber 136 via an inflow port 200 disposed within the piston. Specifically, the inflow port 200 is located within the second piston head 142 and is directed upwards within the rod 138 to a location that is within the control chamber 136.

Figure 5:
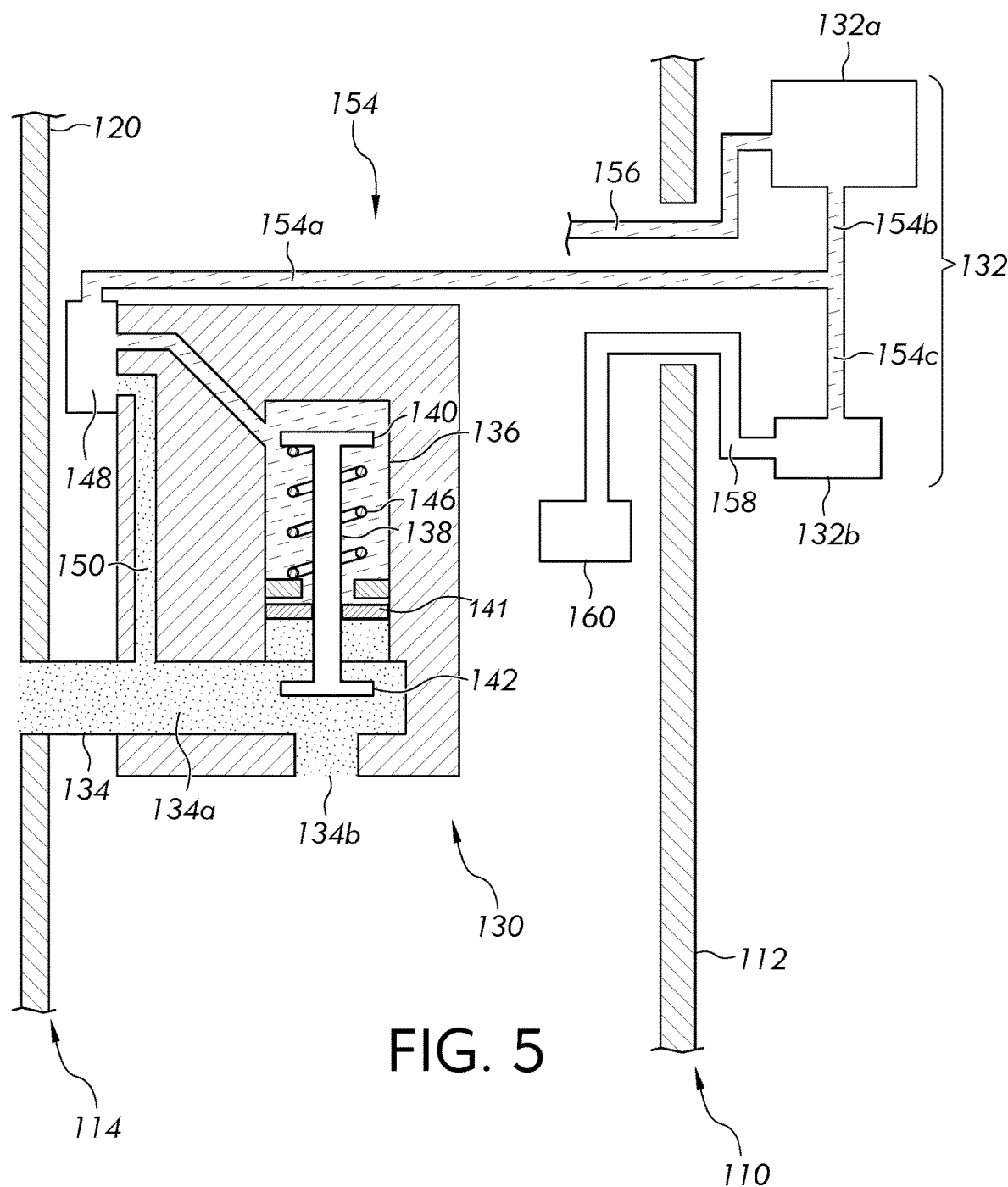
FIG. 5 is a schematic depiction of a valve system of the first embodiment of the emergency core cooling system when a trip valve is in an opened position and when a pressure differential within the inadvertent actuation block valve is below a predetermined pressure differential.
Figure 6:
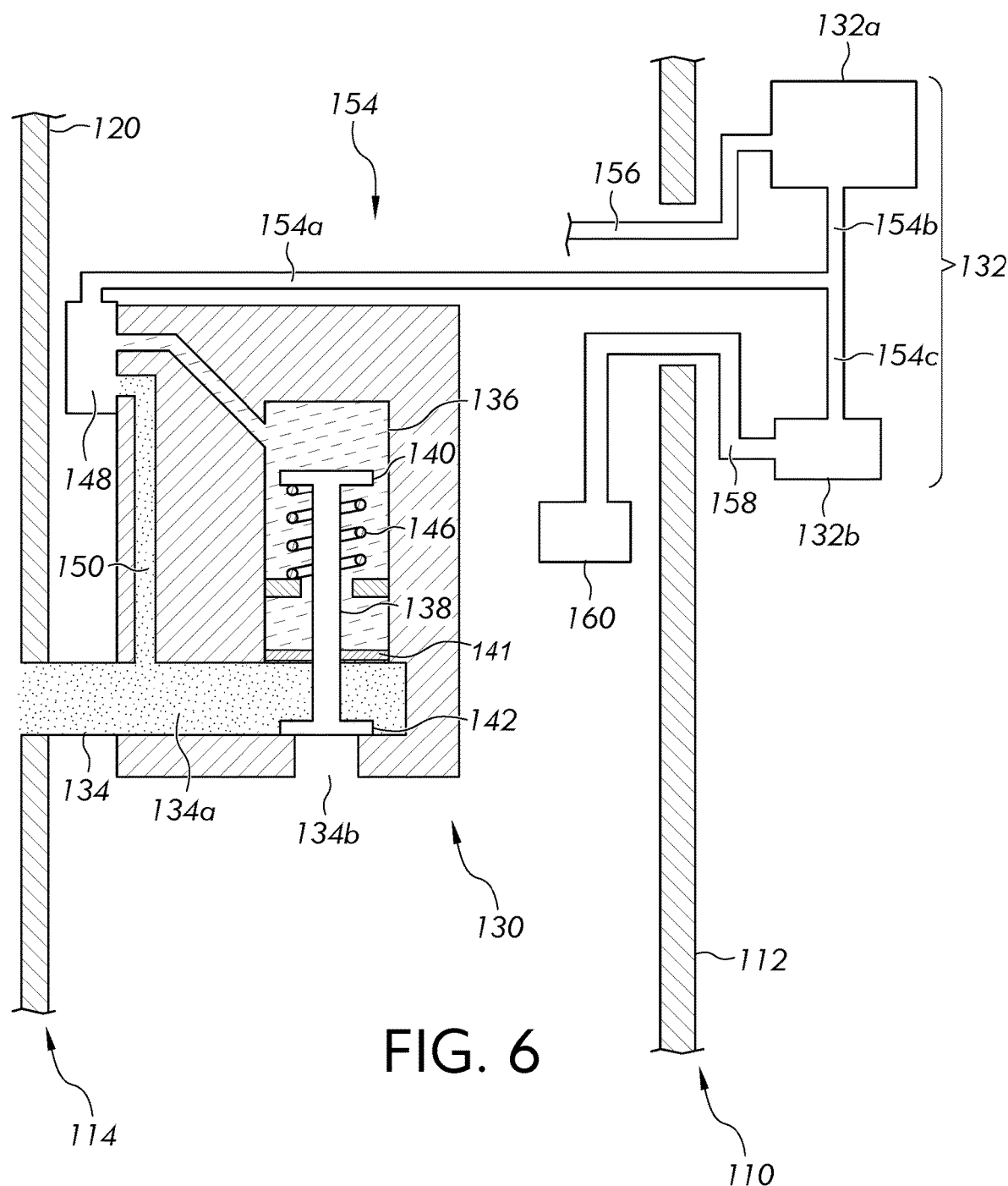
FIG. 6 is a schematic depiction of a valve system of the first embodiment of the emergency core cooling system when the trip valve is in the opened position and when the pressure differential within the inadvertent actuation block valve is at or above the predetermined pressure differential.

Referring now to FIG. 5, the flow of fluid within the emergency core cooling system of the first embodiment is shown after an event has occurred. This event refers to the trip and reset valves 132a, 132b being actuated into their respective "fail" positions. This event may be purposeful or accidental. That is, an operator may purposefully wish to actuate the trip valve 132a into the opened position which, as will be explained below, may result in the main valve 130 actuating to the opened position. Alternatively, the event may refer to an accidental actuation caused by loss of power to the trip actuator valve 132a.

Specifically, if the trip valve 132a actuates to the opened position, the control fluid within the control chamber 136 of the main valve 130 begins to vent to the containment vessel 110. In doing so, the control chamber 136 within the main valve begins to depressurize. When the amount of force supplied by the pressure of the control fluid within the control chamber 136 decreases to the point where it is less than the biasing force provided by the spring 146 and differential pressure acting across the piston, the rod 138 translates vertically upwards such that the second piston head 142 of the rod 138 disengages the second section 134b of the main conduit 134. In other words, when the trip valve 132a is in the opened position, the control chamber 136 within the main valve 130 depressurizes until the main valve 130 actuates to the opened position. As shown in FIG. 5, when the main valve 130 is in the opened position, the reactor fluid entering the first section 134a of the main conduit 134 exits the main valve 130 via the second section 134b of the main conduit 134.

Figure 7A:
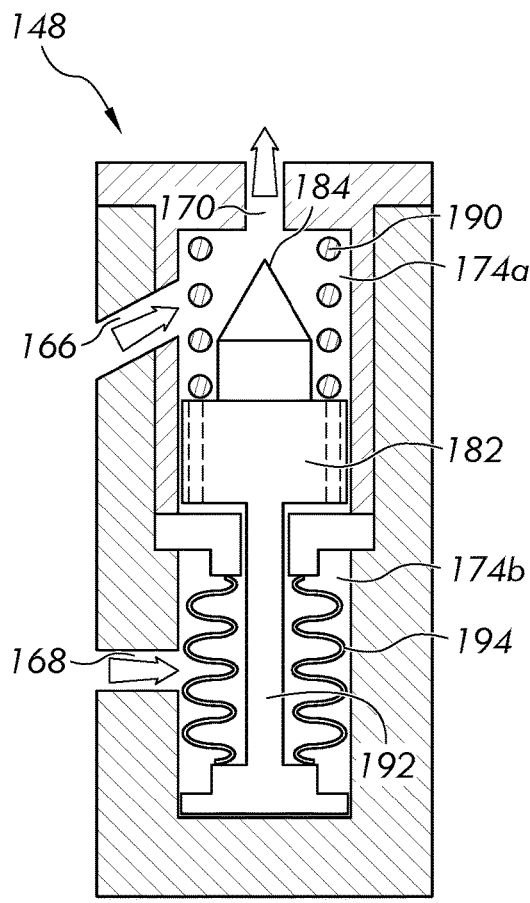
FIG. 7A is a schematic view of the inadvertent actuation block valve of FIG. 3 in an opened position.

With respect to FIG. 7A, the inadvertent actuation block valve 148 is schematically shown in the opened position. As previously mentioned, the inadvertent actuation block valve 148 is a fail open valve that actuates based on a pressure differential. Reactor fluid 128 enters the second section 174b of the cavity within the inadvertent actuation block valve 148 via the reactor reference pressure orifice 168 and control fluid passes through the first section 174a of the cavity within the inadvertent actuation block valve 148 via the first orifice 166 and the outlet orifice 170. When the pressure differential between the reactor fluid 128 and the control fluid is less than a predetermined pressure differential, the inadvertent actuation block valve 148 remains in the opened position. Specifically, the predetermined pressure differential is preferably between 1,000-1,200 PSID, and more preferably, 1,100 PSID. The set point of the predetermined pressure differential at which point the inadvertent actuation block valve 148 actuates is adjustable via shims that may be installed to adjust the load of the spring 146. Additional adjustment may be accomplished by rotating the rod 192 in the disc 182 and securing said adjustment using pin member 202, as depicted in FIG. 3.

When the trip valve 132a actuates to the opened position, as shown in FIG. 5, and the pressure differential within the inadvertent actuation block valve 148 between the reactor fluid 128 and the containment fluid 115 is less than or equal to 1,000 PSID, the inadvertent actuation block valve 148 remains in the opened position, as depicted in FIG. 7A, and allows the control fluid to vent to the containment vessel 110. In doing so, this permits the main valve 130 to depressurize and actuate to the opened position, wherein reactor fluid 128 vents to the containment vessel 110.

Figure 7B:
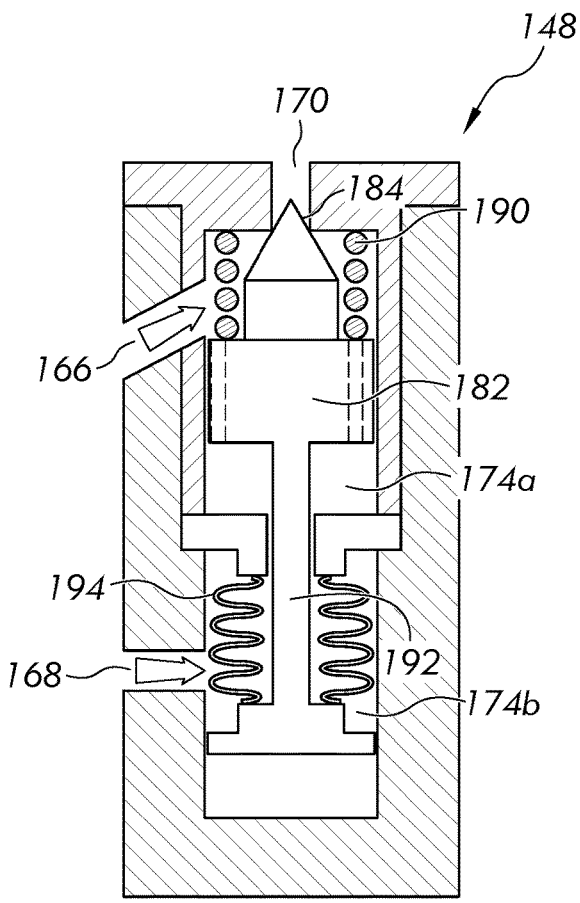
FIG. 7B is a schematic view of the inadvertent actuation block valve of FIG. 3 in a closed position.

With respect to FIG. 7B, when the pressure differential within the inadvertent actuation block valve 148 between the reactor fluid 128 and the containment fluid 115 is greater than or equal to 1,200 PSID, the inadvertent actuation block valve 148 actuates to the closed position. Specifically, the pressure of the reactor fluid 128 within the second section 174b of the cavity provides a force that acts on the bellows 194, causing it to contract. In doing so, the rod 192 and disc 182 simultaneously translate upwards in the vertical direction until the contacting surface 184 of the disc 182 engages the outlet orifice 170. In this position, the control fluid is prohibited from exiting the inadvertent actuation block valve 148, and thus will not vent to the containment vessel 110. There is a momentary decrease in control pressure when the trip valve actuates; the momentary decrease is insufficient to overcome the forces that hold the main valve in the closed position, therefore the main valve remains closed. After the inadvertent actuation block valve closed, there is no further decrease in control pressure, while the control inflow orifice 200 provides a means to re-pressurize the control chamber to a pressure equal to reactor pressure. The increased stabilized control pressure ensures the main valve remains closed when the inadvertent actuation block valve 148 is closed. The aforementioned operation of the inadvertent actuation block valve prevents the main valve 130 from actuating into the opened position when the reactor pressure is above the predetermined differential set pressure above the containment pressure.

The inadvertent actuation block valve 148 provides a means to prevent inadvertent opening of the emergency core cooling valves during normal operation of the plant. The inadvertent actuation block valve 148 not only prohibits this from occurring, but also allows the emergency core cooling system to function properly under normal operating conditions. Furthermore, the inadvertent actuation block is a fail open valve that does not impede actuation of the main valve or continued operation of the open main valves when the reactor pressure is below the predetermined actuation set point.

Figure 8:
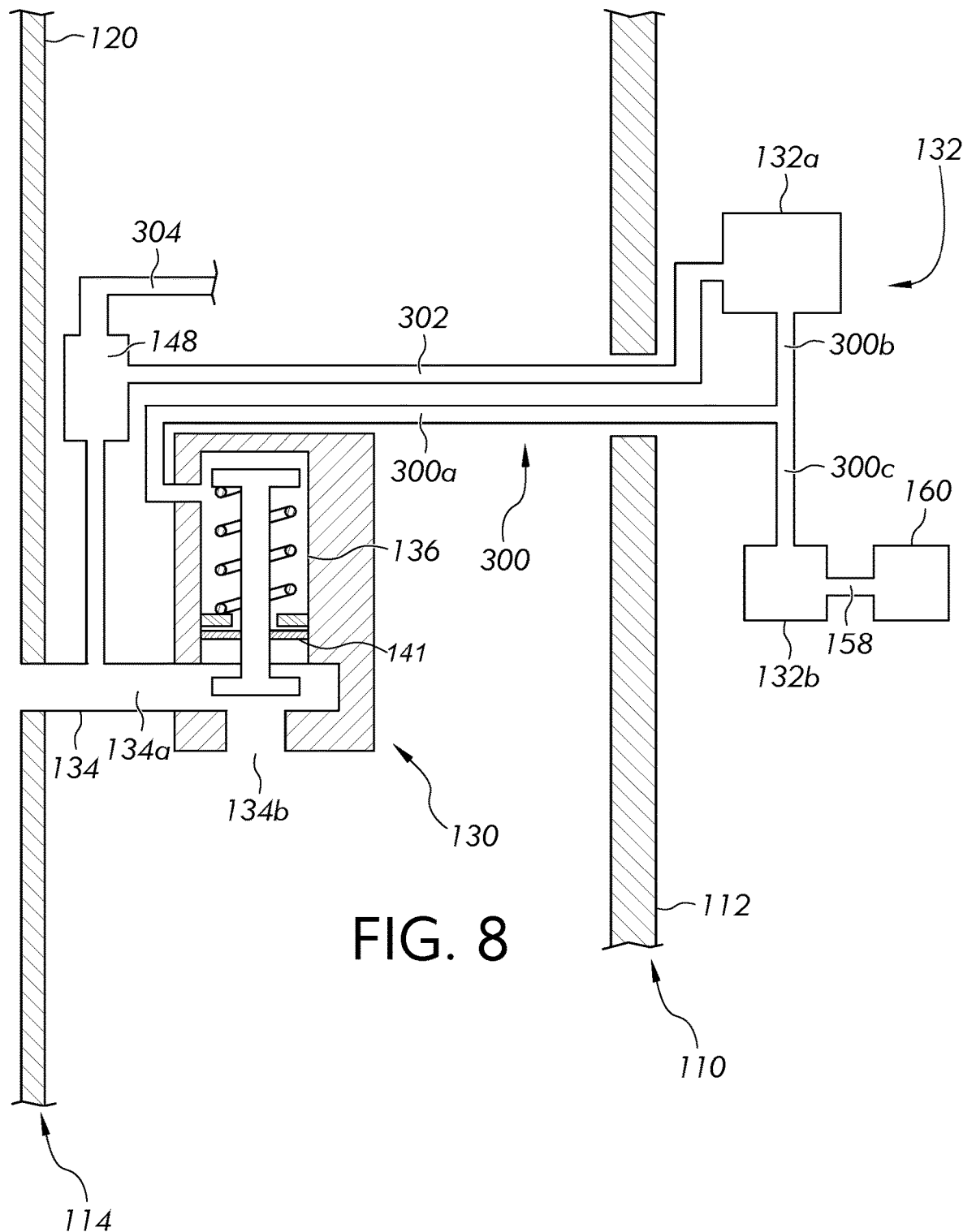
FIG. 8 is a schematic depiction of a second embodiment of an emergency core cooling system for the small modular nuclear reactor shown in FIG. 1.

Moving on to FIG. 8, a schematic depiction of a second embodiment of the emergency core cooling system for the reactor 100 is shown. Of note, the second embodiment of the emergency core cooling system includes similar elements that function in a similar manner with respect to the first embodiment of the emergency core cooling system. For brevity, the below disclosure focuses mainly on the differences between the first and second embodiments of the emergency core cooling system, wherein the same or like elements will be denoted by the same reference numerals.

As was the case with FIG. 2, FIG. 8 depicts the main valve 130 as the reactor recirculation valve 130b. Again, it is to be understood that the reactor vent valve 130a operates in substantially the same manner and, as such, the below disclosure likewise applies thereto. Furthermore, FIG. 8 depicts the second embodiment of the emergency core cooling system when no fluid pressure is in the system (i.e., a dry system). The second embodiment will later be explained in conjunction with figures depicting fluid flow within the emergency core cooling system.

As shown, the main valve 130 (i.e., reactor recirculation valve) is fluidly connected to the reactor vessel 114 via the main conduit 134. Specifically, the main valve 130 is again located outside of the reactor vessel 114. The pilot valve assembly 132 is in fluid communication with the main valve 130 and is configured to manipulate fluid pressure within the control chamber 136 in the main valve 130 in order to actuate the main valve 130 to an opened position or a closed position. Specifically, the pilot valve assembly 132 is located outside of the containment vessel 110.

The pilot valve assembly 132 is directly connected (i.e., no intervening elements) to the control chamber 136 of the main valve 130 via a second conduit 300. The second conduit 300 has a main section 300a, a first branch section 300b, and a second branch section 300c. The first branch section 300b fluidly connects the trip valve 132a to the main section 300a and the second branch section 300c fluidly connects the reset valve 132b to the main section 300a. As shown, the main section 300a, the first branch section 300b, and the second branch section 300c all fluidly connect at the same junction. Alternatively, said sections can join at separate locations.

A third conduit 302 fluidly connects the outflow from the trip valve 132a to the inadvertent actuation block valve 148 and a fourth conduit 304 places the inadvertent actuation block valve 148 and the containment vessel 110 in fluid communication. That is, as compared to the first embodiment of the emergency core cooling system, the configuration of the second embodiment of the emergency core cooling system interposes the inadvertent actuation block valve 148 in-between the trip valve 132a and the containment vessel 110. Also, as shown, the fifth conduit 158 fluidly connects the reset valve 132b to the fluid source 160. Here, the fluid source 160 is shown as being located outside of the containment vessel 110. Alternatively, the fluid source 160 can be positioned inside of the containment vessel 110.

Figure 9:
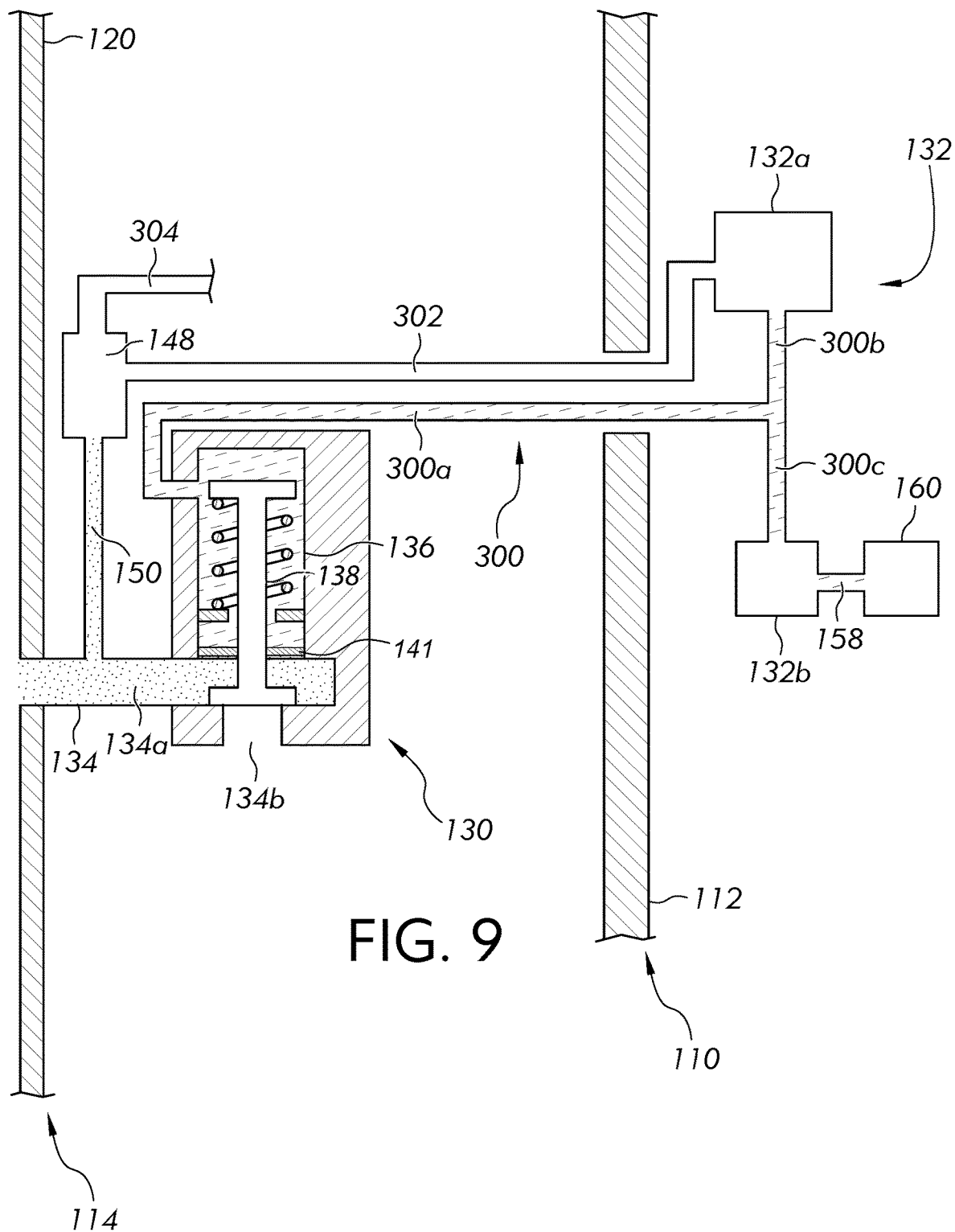
FIG. 9 is a schematic depiction of the second embodiment of the emergency core cooling system during a start-up phase and a normal operation phase.

With reference to FIG. 9, upon start up of the reactor 100, the pilot valve assembly 132 is actuated to supply the control fluid to the control chamber 136 of the main valve 130 in order to actuate the main valve 130 to the closed position. Here, the control fluid flows directly from the reset valve 132b to the control chamber 136 of the main valve 130. That is, when the trip valve 132a is in the closed position, control fluid will not pass through the inadvertent actuation block valve 148. Additionally, FIG. 9 shows reactor fluid 128 flowing through the first conduit 150 and into the inadvertent actuation block valve 148.

Figure 10:
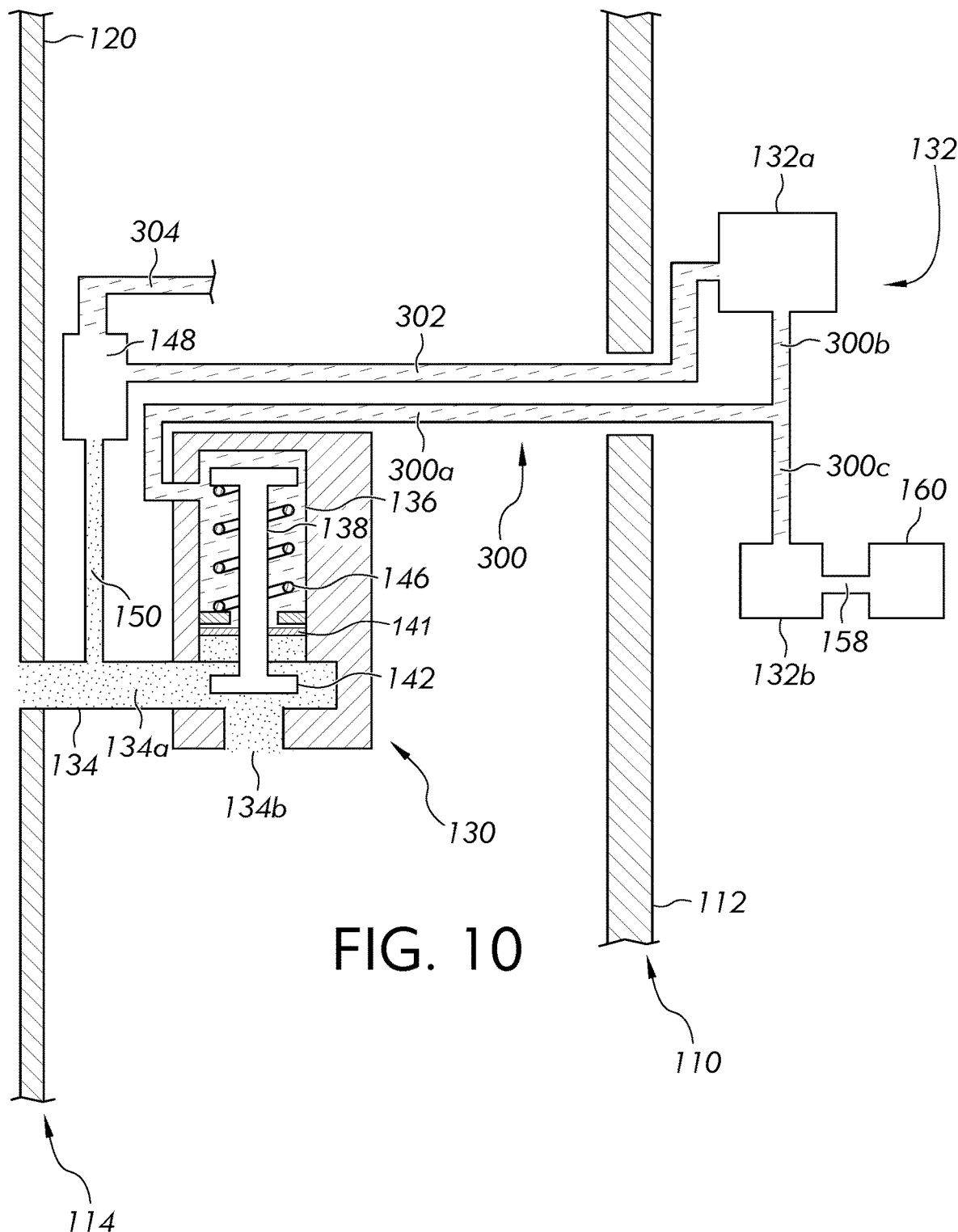
FIG. 10 is a schematic depiction of the second embodiment of the emergency core cooling system when a trip valve is in an opened position and when a pressure of reactor fluid within the inadvertent actuation block valve is below a predetermined pressure.

When the trip valve 132a is actuated to the opened position, as shown in FIG. 10, the control fluid flows to the inadvertent actuation block valve 148. Here, the inadvertent actuation block valve 148 is shown in the opened position, thereby venting the control fluid to the containment vessel 110. When the amount of force supplied by the pressure of the control fluid within the control chamber 136 decreases to the point where it is less than the biasing force provided by the spring 146, the piston translates vertically upwards such that the second piston head 142 of the rod 138 disengages the second section 134b of the main conduit 134. In other words, when the trip valve 132a and the inadvertent actuation block valve 148 are in the opened position, the control chamber 136 within the main valve 130 depressurizes until the main valve 130 actuates to the opened position.

Figure 12A:
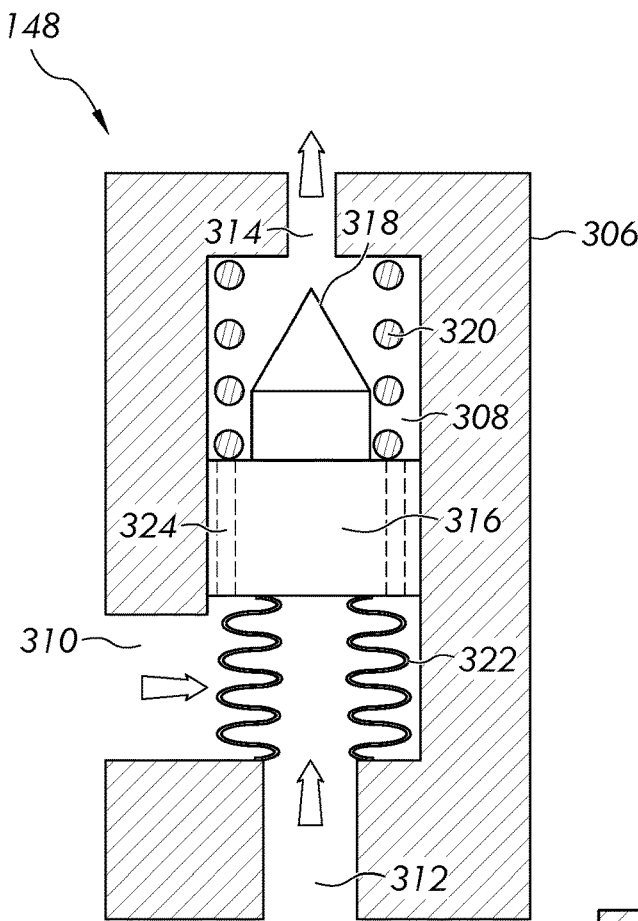
FIG. 12A is a schematic view of the inadvertent actuation block valve in the second embodiment of the emergency core cooling system in an opened position.

FIG. 12A more clearly depicts a second embodiment of the inadvertent actuation block valve 148 of the emergency core cooling system in the opened position. As shown, the inadvertent actuation block valve 148 of the second embodiment of the emergency core cooling system comprises a housing 306 having a chamber 308, an inlet orifice 310, a reactor reference pressure orifice 312, and an outlet orifice 314. The first inlet orifice 310 is in fluid communication with the outlet orifice 314 via communication passages 324 passing through the disc 316, and the chamber 308. A disc 316 is disposed within the chamber and includes a contacting surface 318 disposed adjacent the outlet orifice 314. The contacting surface 318 has a greater width than that of the outlet orifice 314.

A spring 320 is disposed between the disc 316 and the outlet orifice 314 and biases the disc 316 away from the outlet orifice 314. That is, the spring 320 biases the disc 316 in a vertically downwards direction as illustrated in FIG. 12A; it is contemplated that the valve could be oriented otherwise and the disc 316 would translate linearly according to such orientation). The inadvertent actuation block valve 148 also includes a bellows 322 having a first end contacting and sealingly secured to a bottom surface of the disc 316 and a second end contacting and sealingly secured to an inner surface of the housing 306. Specifically, the second end of the bellows 322 circumferentially surrounds and seals the second inlet orifice 312 such that there is no fluid communication between a first area inside the bellows 322 and a second area outside the bellows 322. That is, the bellows 322 fluidly isolates the second inlet orifice 312 from the chamber 308 and from the first inlet orifice 310.

As was the case with the inadvertent actuation block valve employed in the first embodiment of the emergency core cooling system, the various components of the inadvertent actuation block valve 148 in the second embodiment of the emergency core cooling system are all comprised of a metal material. Specifically, the housing 306, the disc 316, the spring 320, and the bellows 322 are all comprised of a metal material. This material selection is essential to sustaining correct functionality over a long period of time. That is, the environment within the inadvertent actuation block valve 148 experiences high temperatures and amounts of pressure due to the reactor fluid 128 and control fluid flowing therein. Other materials (e.g., plastics) would not be suitable for this environment. Each of the aforementioned components is comprised of a metal material to improve longevity of the inadvertent actuation block valve 148, thereby reducing costs associated with maintenance, repair, replacement, etc.

As previously mentioned, the reactor fluid 128 flows into the inadvertent actuation block valve 148 via the first conduit 150. Specifically, the reactor fluid 128 flows into the second inlet orifice 312 of the inadvertent actuation block valve 148. Moreover, when the trip valve 132 is in the opened position, the control fluid flows into the first inlet orifice 310 of the inadvertent actuation valve 148 via the third conduit 302. The control fluid flows through apertures 324 formed in the disc 316 and out of the inadvertent actuation block valve 148 via the outlet orifice 314. From there, the control fluid is vented to the containment vessel 110. In other words, the first area inside the bellows 322 is in fluid communication with the reactor vessel 114 and the second area outside the bellows 322 is in fluid communication with the control chamber 136 of the main valve 130 when the trip valve 132a is in the opened position.

The inadvertent actuation block valve 148 of the second embodiment of the emergency core cooling system actuates based on a pressure of the reactor fluid 128. Specifically, when the pressure of the reactor fluid 128 within the first area inside the bellows 322 is less than a predetermined pressure, the inadvertent actuation block valve 148 remains in the opened position. Preferably, the predetermined pressure is within the range of 1,000-1,200 PSI, and more preferably 1,100 PSI. Additionally, the set point of the predetermined pressure is adjustable via a shim disposed between the spring 320 and the housing 306.

Figure 11:
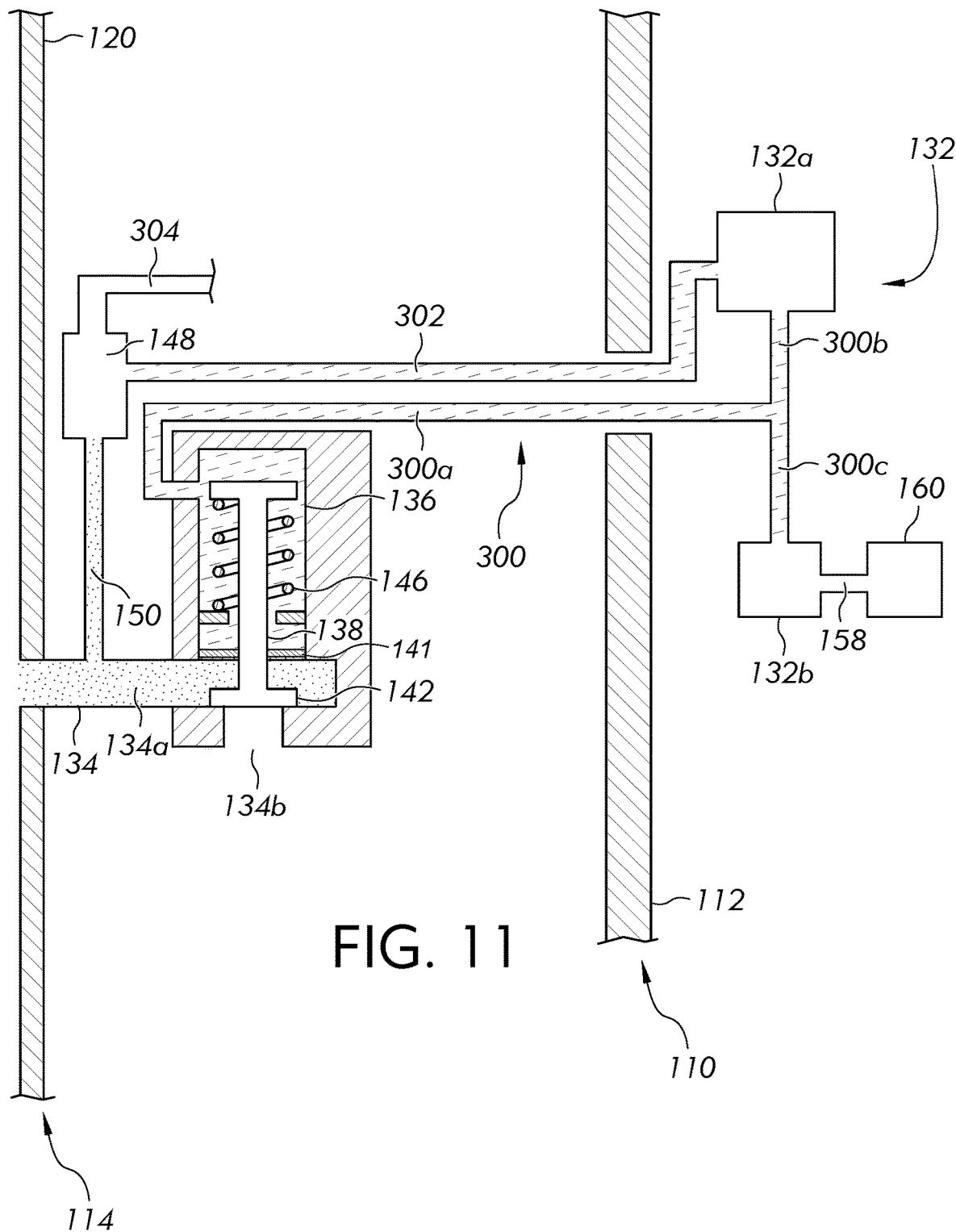
FIG. 11 is a schematic depiction of the second embodiment of the emergency core cooling system when the trip valve is in the opened position and when the pressure of reactor fluid within the inadvertent actuation block valve is at or above the predetermined pressure.
Figure 12B:
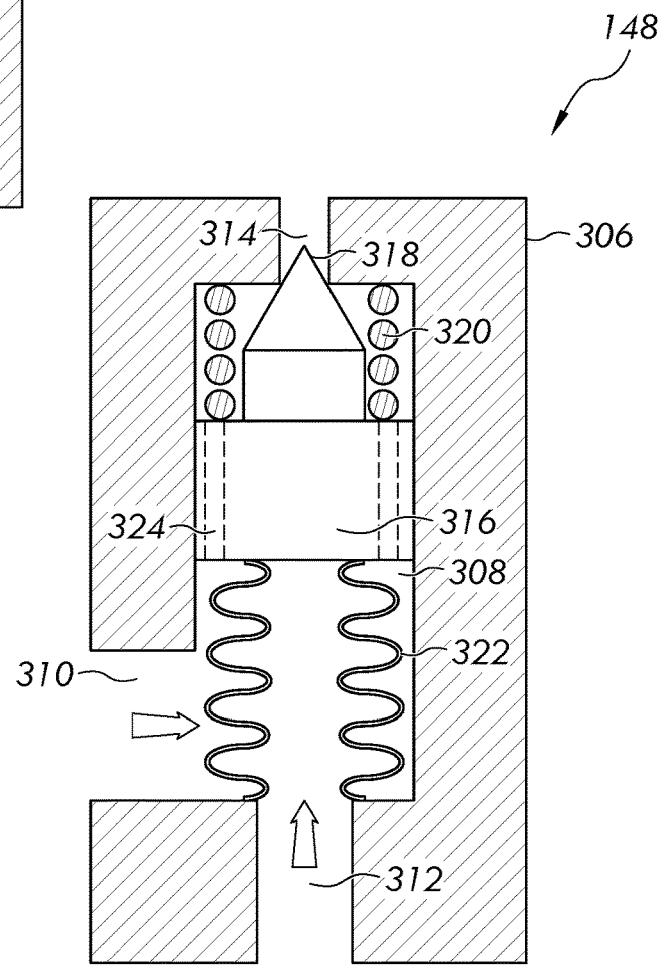
FIG. 12B is a schematic view of the inadvertent actuation block valve in the second embodiment of the emergency core cooling system in a closed position.

With respect to FIG. 12B, when the pressure of the reactor fluid 128 within the first area inside the bellows 322 is greater than or equal to 1,200 PSI, the inadvertent actuation block valve 148 actuates to the closed position. Specifically, the pressure of the reactor fluid 128 within the first area inside the bellows 322 creates a force that acts on the bellows 322 and causes it to expand. In doing so, the disc 316 translates vertically upwards (i.e., against the biasing force of the spring 320) until the contacting surface 318 of the disc 316 sealingly engages (i.e., physically contacts) the outlet orifice 314 and prohibits the control fluid from exiting the inadvertent actuation block valve 148. In other words, with reference to FIG. 11, when the inadvertent actuation block valve 148 is in the closed position, the pressure of the control fluid within the control chamber 136 will stabilize and prevent the main valve 130 from actuating into the opened position.

As was the case with the inadvertent actuation block valve of the first embodiment of the emergency core cooling system, the inadvertent actuation block valve 148 of the second embodiment of the emergency core cooling system provides the benefit of preventing inadvertent actuation of the main valves when reactor pressure is above the predetermined blocking set pressure, while permitting operation of the main valves when reactor pressure is below predetermined set pressure range.

The invention has been described with reference to the example embodiments described above. Modifications and alterations will occur to others upon a reading and understanding of this specification. Examples embodiments incorporating one or more aspects of the invention are intended to include all such modifications and alterations insofar as they come within the scope of the appended claims.

What is claimed is:

1. An inadvertent actuation block valve for a main valve in an emergency core cooling system of a modular nuclear reactor, the inadvertent actuation block valve comprising:
   a housing having a chamber, an inlet orifice, a reactor reference pressure orifice, and an outlet orifice, the inlet orifice and the outlet orifice being in selective fluid communication via the chamber, and the reactor reference pressure orifice being fluidly isolated from the outlet orifice;
   a disc disposed within the chamber, the disc having a contacting surface disposed adjacent the outlet orifice;
   a spring disposed between the disc and the outlet orifice, the spring biasing the disc away from the outlet orifice;
   a rod located within the chamber and positioned adjacent to the disc and extending away therefrom in a first direction, the rod being movable within the chamber; and
   a bellows sealingly secured to the rod, the bellows configured to contract at a predetermined pressure differential between reactor fluid entering the reference pressure orifice and control fluid entering the inlet orifice, the disc translating in a second direction, opposite to the first direction, when the bellows contracts such that the contacting surface of the disc engages the outlet orifice and isolates fluid communication between the inlet orifice and the outlet orifice.

2. The inadvertent actuation block valve of claim 1, the bellows contracts when a pressure differential between the reactor fluid and the control fluid is greater than or equal to a predetermined set pressure.

3. The inadvertent actuation block valve of claim 1, wherein the housing, the disc, the spring, the rod, and the bellows are all comprised of metal.

4. The inadvertent actuation block valve of claim 1, the chamber fluidly extending from the inlet orifice to the outlet orifice, wherein the control fluid enters the housing via the inlet orifice and exits the housing via the outlet orifice.

5. The inadvertent actuation block valve of claim 4, the spring having a first end and an opposite, second end, the first end contacting the disc and the second end contacting a wall of the housing having the outlet orifice formed therein.

6. The inadvertent actuation block valve of claim 5, the spring having a diameter larger than a diameter of the outlet orifice.

7. The inadvertent actuation block valve of claim 4, the spring being entirely disposed within the chamber.

8. The inadvertent actuation block valve of claim 1, the bellows extending along the rod at any location along a length of the bellows.

9. The inadvertent actuation block valve of claim 1, wherein the bellows is positioned within a cavity of the housing and fluidly isolates the control fluid from the reactor fluid within the cavity, and wherein the control fluid acts on an internal surface of the bellows and the reactor fluid acts on an opposite external surface of the bellows.

10. The inadvertent actuation block valve of claim 1, wherein an internal area of the bellows is in fluid communication with the inlet orifice.

11. An inadvertent actuation block valve for a main valve in an emergency core cooling system of a modular nuclear reactor, the inadvertent actuation block valve comprising:
   a housing having a chamber, an inlet orifice, a reactor reference pressure orifice, and an outlet orifice, the inlet orifice and the outlet orifice being in selective fluid communication via the chamber, and the reactor reference pressure orifice being fluidly isolated from the outlet orifice;
   a disc disposed within the chamber, the disc having a contacting surface disposed adjacent the outlet orifice;
   a spring disposed between the disc and the outlet orifice, the spring biasing the disc away from the outlet orifice;
   a rod located within the chamber and positioned vertically below and adjacent to the disc, the rod being movable within the chamber; and
   a bellows sealingly secured to the rod, the bellows configured to contract at a predetermined pressure differential between reactor fluid entering the reference pressure orifice and control fluid entering the inlet orifice, the disc translating vertically upwards when the bellows contracts such that the contacting surface of the disc engages the outlet orifice and isolates fluid communication between the inlet orifice and the outlet orifice, the housing comprising:
- a lower housing having a cavity comprising a first section and a second section, the inlet orifice and reactor reference pressure orifice positioned within the lower housing and in fluid communication with the first and second sections of the cavity, respectively; and
- an upper housing having a protrusion oriented vertically downwards with respect to a horizontal surface of the upper housing, the protrusion having a hollow space therein defined by a sidewall,
- the first and second sections of the cavity being fluidly isolated from one another such that there is no fluid communication between the first section and the second section, and the protrusion of the upper housing located within the first section of the cavity such that a through hole in the sidewall of the protrusion places the hollow space in fluid communication with the inlet orifice.

12. The inadvertent actuation block valve of claim 11, the disc comprising an extension member extending vertically upwards from a base member, the contacting surface located at tip of the extension member and the spring surrounding the extension member.

13. The inadvertent actuation block valve of claim 12, further comprising a plate with aperture and two metal o-rings with, the rod extending through said aperture such that the rod connects the disc, positioned within both the first section of the cavity with the bellows, located in the second section of the cavity.

14. The inadvertent actuation block valve of claim 13, the rod comprising a first end and a second end, the first end engaging the disc and the second end including a head, the bellows having a first portion and a second portion, the first portion adjacent a first surface of the plate and the second portion secured to the head of the rod.

15. An inadvertent actuation block valve for a main valve in an emergency core cooling system of a modular nuclear reactor, the inadvertent actuation block valve comprising:
- a housing having a first chamber, an inlet orifice, a reactor reference pressure orifice, and an outlet orifice, the inlet orifice and the outlet orifice being in selective fluid communication via the first chamber, and the reactor reference pressure orifice being fluidly isolated from the outlet orifice;
- a disc disposed within the first chamber, the disc having a contacting surface disposed adjacent the outlet orifice;
- a spring disposed between the disc and the outlet orifice, the spring biasing the disc away from the outlet orifice;
- a rod extending within the first chamber and positioned vertically below and adjacent to the disc, the rod being movable within the first chamber; and
- a bellows sealingly secured to the rod, the bellows configured to contract at a predetermined pressure differential between reactor fluid entering the reference pressure orifice and control fluid entering the inlet orifice, the disc translating vertically upwards when the bellows contracts such that the contacting surface of the disc engages the outlet orifice and isolates fluid communication between the inlet orifice and the outlet orifice;
- wherein the bellows is positioned in a second chamber in the housing and fluidly isolates the control fluid from the reactor fluid within the second chamber, and wherein the control fluid acts on an internal surface of the bellows and the reactor fluid acts on an opposite, external surface of the bellows.

* * * * *